United States Patent
Adelman et al.

(10) Patent No.: US 8,095,426 B2
(45) Date of Patent: Jan. 10, 2012

(54) SYSTEM AND METHOD FOR COMPARATIVE SIZING BETWEEN A WELL-FITTING SOURCE ITEM AND A TARGET ITEM

(75) Inventors: Melissa B. Adelman, Plainview, NY (US); Garrett Alexander Berg, Plainview, NY (US); Jessica C. Crowell, Charlotte, NC (US)

(73) Assignee: Size Me Up, Inc., Plainview, NY (US)

( * ) Notice: Subject to any disclaimer, the term of this patent is extended or adjusted under 35 U.S.C. 154(b) by 996 days.

(21) Appl. No.: 12/070,619

(22) Filed: Feb. 19, 2008

(65) Prior Publication Data

US 2009/0210320 A1 Aug. 20, 2009

(51) Int. Cl.
G06Q 30/00 (2006.01)
G06F 17/30 (2006.01)

(52) U.S. Cl. .................. 705/26.1; 705/26.7; 705/27.1

(58) Field of Classification Search ......... 705/26.1–27.2
See application file for complete search history.

(56) References Cited

U.S. PATENT DOCUMENTS

| | | | |
|---|---|---|---|
| 5,680,528 A | 10/1997 | Korszun | |
| 5,930,769 A | 7/1999 | Rose | |
| 6,266,649 B1 * | 7/2001 | Linden et al. | 705/7.29 |
| 6,311,403 B1 | 11/2001 | Macrini | |
| 6,665,577 B2 | 12/2003 | Onyshkevych et al. | |
| 6,701,207 B1 | 3/2004 | Gazzuolo | |
| 6,711,455 B1 | 3/2004 | Holloway et al. | |
| 6,978,549 B2 | 12/2005 | Ellis | |
| 7,092,782 B2 | 8/2006 | Lee | |
| 7,162,441 B2 | 1/2007 | Nabarro | |
| 7,194,428 B2 | 3/2007 | Wan et al. | |
| 7,242,999 B2 | 7/2007 | Wang | |
| 7,310,883 B1 | 12/2007 | Park | |
| 7,398,231 B2 * | 7/2008 | Wan et al. | 705/26.7 |
| 7,421,306 B2 * | 9/2008 | Adiseshan | 700/130 |
| 7,469,218 B2 * | 12/2008 | Morley et al. | 705/27.2 |
| 7,617,016 B2 * | 11/2009 | Wannier et al. | 700/132 |
| 7,792,706 B2 * | 9/2010 | Tirumalareddy et al. | 705/26.8 |
| 7,921,042 B2 * | 4/2011 | Jacobi et al. | 705/26.7 |
| 2002/0004763 A1 * | 1/2002 | Lam | 705/26 |
| 2002/0032723 A1 * | 3/2002 | Johnson et al. | 709/203 |
| 2002/0045959 A1 * | 4/2002 | Van Overveld | 700/90 |
| 2002/0077922 A1 | 6/2002 | Srinivasan | |

(Continued)

OTHER PUBLICATIONS

"Gap Inks Deal with EZSize for Online Fit". Women's Wear Daily. Oct. 23, 2000. vol. 180, No. 77, p. 2+, [recovered from Dialog on Oct. 18, 2011].*

(Continued)

*Primary Examiner* — Will Allen
*Assistant Examiner* — Kathleen G Palavecino
(74) *Attorney, Agent, or Firm* — Cheryl F. Cohen, LLC

(57) ABSTRACT

A comparative sizing method in which at least one well-fitting source item is received having at least one source item property associated therewith and a target item having at least one associated target item property for which a resultant comparative sizing recommendation is being requested based on the at least one source item as specified by its at least one source item property associated therewith. Each source item and the target item is correlated with each database item having associated database item properties in a database based on source-database item matches and target database item matches. The resultant comparative sizing recommendation is determined based on the correlated source-database item matches and target-database item matches.

28 Claims, 2 Drawing Sheets

U.S. PATENT DOCUMENTS

| | | | |
|---|---|---|---|
| 2002/0138170 A1* | 9/2002 | Onyshkevych et al. | 700/130 |
| 2002/0188372 A1 | 12/2002 | Lane et al. | |
| 2004/0083142 A1 | 4/2004 | Kozzinn | |
| 2005/0102202 A1* | 5/2005 | Linden et al. | 705/27 |
| 2006/0287877 A1 | 12/2006 | Wannier et al. | |
| 2007/0016485 A1 | 1/2007 | Drash et al. | |
| 2007/0022013 A1 | 1/2007 | Tousignant | |
| 2007/0198120 A1* | 8/2007 | Wannier et al. | 700/138 |
| 2008/0126962 A1* | 5/2008 | Cook | 715/764 |
| 2008/0163344 A1* | 7/2008 | Yang | 726/4 |
| 2008/0195973 A1* | 8/2008 | Shimkin | 715/817 |
| 2008/0201244 A1* | 8/2008 | Johnson | 705/28 |
| 2008/0255920 A1* | 10/2008 | Vandergriff et al. | 705/10 |
| 2009/0059175 A1* | 3/2009 | Le Quesne et al. | 353/28 |
| 2009/0182612 A1* | 7/2009 | Challener et al. | 705/10 |

OTHER PUBLICATIONS

"Sizing Technology Could Bring Sighs of Relief; a Handful of Companies Try to Make It Easier to Buy Online, But Not All May Last". Daily News Record. Nov. 17, 2000. p. 4, [recovered from Dialog on Oct. 18, 2011].*

"The Right Size Aims to Reduce Apparel Returns; Company Is Developing Sizing Software to Enhance Online Appeal Purchasing and Cutdown on Returns". Daily News Record. Apr. 21, 2000. p. 20, [recovered from Dialog on Oct. 18, 2011].* www.truejeans.com (3 pages)(Feb. 19, 2008).
www.myshape.com (3 pages)(Feb. 19, 2008).
www.zafu.com (4 pages)(Feb. 19, 2008).
www.gennarosizing.com (2 pages)(Feb. 19, 2008).

* cited by examiner

SYSTEM AND METHOD FOR COMPARATIVE SIZING BETWEEN A WELL-FITTING SOURCE ITEM AND A TARGET ITEM

BACKGROUND OF THE INVENTION

1. Field of the Invention

The present invention is directed to a system and method for identifying accurate apparel size to fit a consumer prior to purchase, and in particular, to a system and method for correlating a size of a target item based on the size of a source item that fits without requiring a body measurement even among different brands and styles.

2. Description of Related Art

Finding the correct size in an article of clothing represents one of the most challenging aspects of making apparel purchases. Today, consumers have a wide variety of channels through which to make apparel purchases. However their ability to select the correct size in an item still very much remains a matter of trial and error.

Traditionally, consumers visit a retail store and try on apparel in a fitting room. The problem with this approach is that it is necessary to try on multiple sizes for any particular item, unless the customer knows his or her appropriate size in advance. This ad hoc approach requires significant resources for retailers—inventory is tied up, non-fitting items must be re-stocked, and staff is required to supervise fitting rooms. This approach is also less than ideal for shoppers who find it time consuming to visit a brick-and-mortar store to try on different sizes.

Increasingly, consumers today are shopping online via the Internet. With growth rates ranging from 21%-72% per year since 1999, online apparel retail ("e-tail") sales are the largest and fastest-growing category in the United States. While the industry's $22.1 billion size and large growth rates are impressive, the online apparel retailer segment has yet to reach their full potential because it is faced with two major problems: (i) a high volume of returns with the most prevalent reason for returns being incorrect size; and (ii) reluctance to buy online in the first place due to sizing uncertainty. In an attempt to overcome sizing uncertainty, it is not uncommon for consumers to purchase two or three of the same item in different sizes with the intention to keep only a single item that fits best and return the other items. Returned merchandise diminishes top-line sales figures for e-tailers. For example, the e-tailer can only resell a percentage of returned merchandise and then, on average, it must be priced below original retail value. Millions of dollars are lost as a result of returns due to improper sizing. In addition to the direct losses associated with returned items, many e-tailers offer free return service to consumers as an incentive to purchase online. Apparel websites spend an average of $9 per item on the entire return process—this includes staffing a customer service center, postage, and restocking fees.

Though significant, the price tag on the apparel industry's sizing problem is actually much bigger than simply the costs associated with returns. In a brick-and-mortar setting, money is left on the table when retailers invest resources on shoppers who spend significant time trying on clothes only to find that none of the articles fit or that the correct size is not available. In addition, some consumers avoid shopping for clothing simply because they do not have the time or desire to go through the hassle of using the fitting room. In an online setting, the shopper's lack of viable options for selecting the correct size in an article of clothing exponentially increases the loss of potential sales to e-tailers. Studies show that the most common reason browsers are not converted to buyers is because they are "unsure of accurate sizing." Further proof of this issue is evidenced in the industry's extremely low browse-to-buy ratio of only 2.2 purchases for every 100 browsers. By increasing browse-to-buy conversions by just a fraction, e-tailers would see their top-line sales figures jump significantly. Another intangible cost inextricably tied to the sizing issue is lost customer loyalty that the e-tailers experience when the online customer is dissatisfied with his or her purchase. Research shows that 11% of dissatisfied online apparel customers will not shop on the site again. Therefore, the inability to provide shoppers with easy, accurate and convenient sizing recommendations costs apparel retailers billions of dollars in potential sales.

In an attempt to mitigate size related costs, sizing charts may be provided in the retail store (e.g., via a printed chart or kiosk) or accessible on the Internet to aid in determining the consumer's size. These conventional sizing charts are often inaccurate because they force the individual to choose a size based on "standard" body measurements. Few individuals fit into a single standardized body proportion classification or category. In addition, consumers are required to take a plurality of body measurements before they are provided with these size recommendations. Calculating a body measurement requires certain tools such as a measuring tape, which is something that may not be readily accessible by the consumer (e.g., when the consumer is in the retail store or when purchasing an item via the internet while at work). Another problem associated with requiring body measurements as a precondition to a sizing recommendation is that the accuracy of the result is completely dependent on the accuracy of the underlying body measurement. Many measurements such as bust line require that the measurement be obtained at a specific location on the body not readily appreciated by the average layperson or consumer. One could educate the consumer, in advance, as to the precise body location and method by which a particular body measurement is to be measured; however, once again this requires additional effort and time on the part of the consumer and is still subject to error if not conducted in accordance with those precise instructions. Still another disadvantage to requiring a body measurement is that some measurements, for example, inseam, are difficult to obtain without assistance. An underlying flaw associated with such conventional sizing or fitting systems is that if the underlying body measurement is inaccurate then clearly the recommended size will also be incorrect.

Some websites have been developed that are devoted to addressing the problem of size by identifying the ideal clothing articles, styles, and one or more sizes of apparel for one's body measurements and/or body type. Examples include zafu.com, myshape.com, and truejeans.com. Consumers are required when using these websites to fill out numerous data entry fields as to body measurement and/or body type before their recommendation is processed. As previously explained, such measurements require access to a tape measure and thus are not very user friendly. Another disadvantage associated with these online sizing websites is that the consumer is restricted to the brands and styles sponsored by select e-tailers. These solutions are less than ideal since online shoppers typically visit their favorite websites and attempt to find their size in an item of their choosing, rather than the other way around. In fact, the current online sizing sites can often exacerbate rather than solve the problems faced by online apparel retailers. First, these sites often provide the consumer with a range of possible size recommendations comprising two to three sizes corresponding to the consumer's body type. As previously mentioned, when faced with such a dilemma the consumer often purchases multiple sizes of a single item and thereafter returns those sizes that do no fit. In addition, these sites require the consumer to leave the e-tailer's website to obtain the size recommendation thereby reducing the likelihood of a potential purchase for that e-tailer as the shopper is redirected to another website.

Given the problems that apparel sizing uncertainty creates for shoppers and retailers, it is desirable to develop an improved sizing system and method that is user friendly, time efficient, does not require body measurements and may generate comparative size recommendations among different brands and styles.

SUMMARY OF THE INVENTION

One aspect of the present invention is directed to an improved comparative sizing recommendation system and method that is accurate, user friendly and does not require that the user or consumer know any body measurements.

Another aspect of the present invention relates to an improved comparative sizing recommendation system and method that may be integrated into a retail environment thereby improving browse-to-buy conversion, reducing the prevalence of size related returns, reducing the occurrence of purchasing or trying multiple sizes for a single item, and increasing overall sales to the retailer.

Still another aspect of the present invention is directed to an improved comparative sizing recommendation system and method that focuses on comparable, rather than absolute size.

Yet another aspect of the present invention relates to an improved comparative sizing recommendation system and method that avoids having to try on an item prior to purchasing.

The present invention relates to a system and method for obtaining a recommended size of a desired target item even among different brands and styles based on one or more well-fitting source items identified by the consumer.

Another aspect of the present invention is directed to a comparative sizing method in which at least one well-fitting source item is received, each of the at least one source items having at least one source item property associated therewith. Also, a target item is received having at least one associated target item property for which a resultant comparative sizing recommendation is being requested based on the at least one source item as specified by its at least one source item property associated therewith. Each of the at least one source items is correlated with each of a plurality of database items having at least one database item property associated therewith in a database based on source-database item matches between the associated at least one source item property of each of the at least one source items and the associated at least one database item property of each of the plural database items in the database. In addition, each of the at least one source items is correlated with each of the plurality of database items in the database based on target-database item matches between the associated at least one target item property of the target item and the associated at least one database item property of each of the plural database items in the database. The resultant comparative sizing recommendation including at least one target match size is determined based on the correlated source-database item matches and target-database item matches.

Yet another aspect of the present invention is relates to a computer implemented method for operating a comparative sizing system. The following items are received and stored in a memory device: (i) at least one well-fitting source item, each of the at least one source items having at least one source item property associated therewith; (ii) a target item and at least one associated target item property for which a resultant comparative sizing recommendation is being requested based on the at least one source item as specified by its at least one source item property associated therewith. A computer system is used to: (i) retrieve from the memory device and correlate each of the at least one source items with each of a plurality of database items in a database stored in the memory device based on source-database item matches between the associated at least one source item property of each of the at least one source items and the associated at least one database item property of each of the plural database items in the database; and (ii) retrieve from the memory device and correlate each of the at least one source items with each of the plurality of database items in the database based on target-database item matches between the associated at least one target item property of the target item and the associated at least one database item property of each of the plural database items in the database. In addition, the computer system determines the resultant comparative sizing recommendation, wherein the resultant comparative sizing recommendation includes at least one target match size based on the correlated source-database item matches and target-database item matches.

Still another aspect of the present invention is directed to a computer program embodied on a computer-readable medium for operating a comparative sizing system. The computer program includes: (a) a code segment that receives at least one well-fitting source item, each of the at least one source items having at least one source item property associated therewith; (b) a code segment that receives a target item and at least one associated target item property for which a resultant comparative sizing recommendation is being requested based on the at least one source item as specified by its at least one source item property associated therewith; (c) a code segment that correlates each of the at least one source items with each of a plurality of database items in a database based on source-database item matches between the associated at least one source item property of each of the at least one source items and the associated at least one database item property of each of the plural database items in the database; and that correlates each of the at least one source items with each of the plurality of database items in the database based on target-database item matches between the associated at least one target item property of the target item and the associated at least one database item property of each of the plural database items in the database; and (d) a code segment that determines the resultant comparative sizing recommendation including at least one target match size based on the correlated source-database item matches and target-database item matches.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which.

DETAILED DESCRIPTION OF THE INVENTION

For the purposes of the present invention the term "item" is defined as any item manufactured in different sizes. Typically, the item is worn by an individual, but need not necessarily be. The term "item" may include, but is not limited to, apparel (e.g., sweaters, sweatshirts, T-shirts, tank tops, ¾ sleeve shirts, collared button-downs, polo shirts, skirts, dresses, shorts, pants, capri pants, cropped pants, outer garments, jackets, underwear, sleepwear), accessories (e.g., belts, hats, gloves), and footwear (e.g., boots, shoes, sneakers, sandals, flip-flops).

The present invention is directed to a comparative sizing system and method that does not require the user to know any of his or her body measurements. Instead, the present inventive comparative sizing system and method requires the user to identify at least one well-fitting source item (such as a garment the user is currently wearing, has in his or her closet or owns as part of his or her wardrobe). In addition to providing the source item, a target item is identified for which the user is interested in obtaining a comparative sizing recommendation. Typically, the target item is an item that the user is interested in purchasing.

Figure 1:
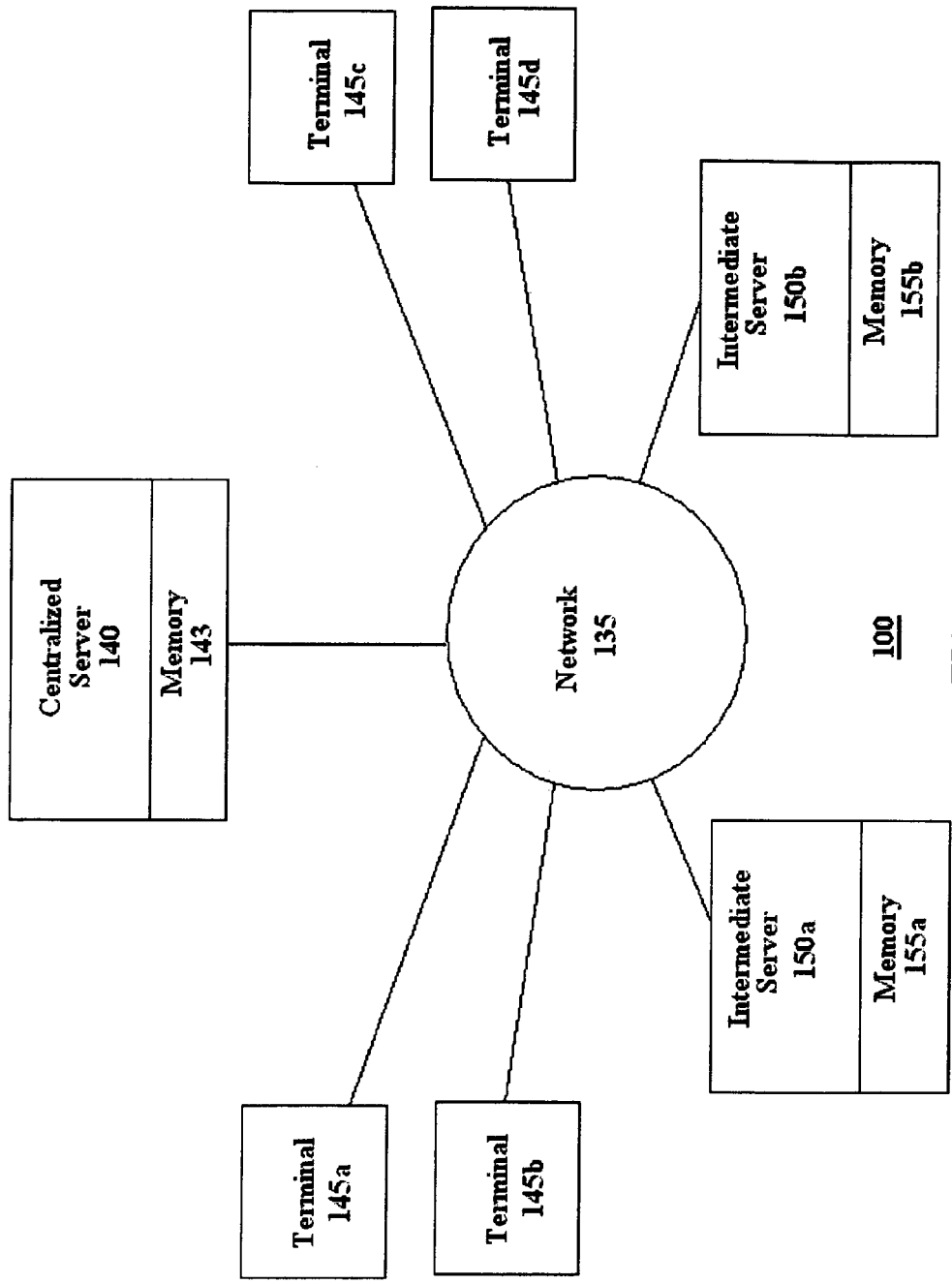
FIG. 1 is an exemplary high level schematic diagram of a comparative sizing system in accordance with the present invention.

FIG. 1 is an exemplary high level schematic diagram of a comparative sizing system 100 in accordance with the present invention. The system 100 depicts a configuration in which participants communicate via a network 135 for exchanging information/data such as the Internet, an intranet, an extranet, Ethernet, ATM, wide area network (WAN), local area network (LAN), Public Switched Telephone Network (PSTN) or satellite communications. Hereinafter the present invention will be shown and described with respect to the Internet, however, other networks are contemplated and within the intended scope of the present invention. Users (e.g., consumers, shoppers, customers, purchasers, retailers, wholesalers, manufacturers, researchers, or any other individual or entity) interact in the system via terminals or computing devices (145a, 145b, 145c, 145d) such as a personal computer, network computing device, workstation, laptop, minicomputer, mainframe, kiosk, personal digital assistant (PDA), handheld or mobile computer (e.g., Palm Pilot®), mobile telephone and/or any combination thereof which may be either wired or wirelessly connected to the network 135. Four terminals are shown in FIG. 1, but any number of one or more terminals may be employed, as desired. The users may obtain comparative sizing recommendations for a desired target item via the Internet by accessing comparative sizing programming and associated database information via one of the terminals (145a, 145b, 145c, 145d). Electronic communication of information to and from a terminal via the Internet is preferred, however, any means of communication may be employed. For example, in addition to or aside from the Internet, the information concerning the source and target items may be offered via a printed document, electronically or over the telephone. Each terminal (145a, 145b, 145c, 145d) has an associated memory device for storing therein the appropriate software programming necessary to communicate via the Internet as well as to store any necessary information.

A user is prompted, for example, via a graphical user interface (GUI), to provide information concerning at least one well-fitting source item by specifying its source item properties. The source item is an item that the user knows fits him or her well, for instance, a garment that the user is currently wearing or a garment that is part of the user's wardrobe such as an item in his or her closet. However, it is not a requirement of the present invention that the user actually own the source item. For instance, the source item may represent a garment the user has recently tried on in a retail store without purchasing or a friend's garment. The only requirement of the source item is that the individual for whom the comparative sizing recommendation is being sought deems it to be well-fitting. It should be noted that the user may deem an item to be well-fitting despite it being very tight or very loose. Therefore, the present inventive comparative sizing scheme is clearly not based on precise body measurements but instead on the user's own subjective perspective and assessment of a well-fitting item.

Each source and target item is described by one or more properties associated with that item. Properties represent information which may be obtained from a visual observation of the physical item itself without taking any measurements or requiring any additional tools such as a tape measure. Typically, the properties used to identify an item may be readily obtained simply by the user observing the item and/or reading indicia located on the item itself or a tag attached thereto. A non-exhaustive list of properties that may be used to describe any item (e.g., a source item, a target item or a database item) includes, but is not limited to: size (primary size (e.g., Small, Medium, Large, 0, 1, 2, 4, 6) and possibly one or more secondary sizes depending on the item (e.g., inseam for pants; or neck size, chest size or arm length for men's dress shirts and suit jackets), generic description of item type (e.g., short sleeve, long sleeve, tank top, pants, skirt, capris, cropped pants, dresses, outer garments, jackets, underwear, sleepwear, footwear), item sub-type (e.g., sweater, sweatshirt, T-shirt, denim, dress pant), brand name (e.g., GAP™, Banana Republic™, Express™), style name (i.e., the name in the industry used to best describe the item (e.g., shift dress, tube top, Editor, Marisa, Madison Flare)); style number (a number assigned to each item style and in some instances may be coded to indicate the season/year and other style information); Registered Identification Number (RN) (i.e., a number issued and registered by the FTC to a firm in the U.S. that manufactures, imports, markets, distributes, or otherwise handles textile, wool, or fur products); stretch (e.g., yes or no); waist (e.g., low rise, high rise); cut (e.g., boot cut, skinny/slim); color (e.g., some high-end jeans differ in size depending on whether black wash or blue wash); material (e.g., cotton, denim, nylon, silk, polyester). Other properties are contemplated and within the intended scope of the present invention depending on the item being described.

The user identifies the source item by specifying one or more source item properties preferably including at least size. Additional properties other than size may be specified, but are not required. Most preferably at least size and brand are specified for the source item. In most instances, but not always, the more source item properties specified the greater the accuracy of the resultant comparative target sizing recommendation.

Another option to increase the accuracy of the resultant comparative target sizing recommendation is to identify multiple source items. Multiple source items may be initially identified by the user prior to processing of any comparative sizing. Otherwise, the comparative sizing system may be iteratively repeated each time adding another source item. That is, a first source item may be identified and a first resultant comparative sizing recommendation produced. A second source item different from the first source item is thereafter identified and a resultant comparative sizing recommendation is generated based on both the first and second source items. This iterative process may be repeated, as desired, for any number of source items.

In addition to at least one source item, a target item is identified about which the user is requesting a comparative sizing recommendation based on the at least one source item as specified by its source item properties. The target item is an item that the user doesn't know or wishes to confirm the size that will best fit a target individual. In most cases, the target item will be an item that the user is interested in purchasing for himself/herself and wants to determine or confirm the size that will fit best prior to purchasing. The target item is specified by at least one target item property. Preferably at least generic description of item type is at least one target item property identified. Most preferably, at least a generic description of item type and brand name are identified target item properties. Target item properties other than, or in addition to, generic description of item type and brand name may be specified such as, but not limited to, those properties discussed above.

The target item may be identified by the user, prompted via the graphical user interface, to enter via terminal (145) its target item properties. In the case of a user visiting a e-tailer's website, the target item properties associated with a particular item selected for purchase by the user are preferably automatically retrieved without the user having to enter this information. Yet another possibility is that the target item properties may be obtained by scanning the target item such as by scanning a label or tag associated with the target item.

Although the present invention has been described as the source item being provided by the user prior to those of the target item, the order in which such information is provided may be reversed. Both parameters are required in order to perform the comparative sizing functionality in accordance with the present invention, but the order in which the information is provided may be varied.

Information including at least one source item as described by its associated source item properties as well as the target item as described by its associated target item properties is transmitted by way of the network 135 from the terminal (145a, 145b, 145c, 145d) directly to the centralized server 140 or indirectly via an intermediate server (150a, 150b). There are several different ways in which a user may access the comparative sizing system and method in accordance with the present invention, only a few of which will be discussed in further detail below.

One way is for the user to visit the comparative sizing recommendation website. Then the information provided by the user will be transmitted directly to the centralized server 140 via the network 135, e.g., the Internet. Alternatively, the user may access the comparative sizing system and centralized server 140 in which such processing is performed by visiting a website other than the comparative sizing recommendation website. By way of illustrative example, the user may visit an e-tailer's website and from there select an option to access the comparative sizing recommendation system and method. The information provided by the user from the terminal may then be transmitted first to the intermediate server (150a, 150b) associated with the e-tailer's website and from there further transmitted to the centralized server 140. Two intermediate servers (150a, 150b) and their associated memories (155a, 155b) are shown in FIG. 1, however, the system may be modified to include any number of intermediate servers or none.

The information received from the terminals is stored in a memory 143 associated with the centralized server 140. This information may later be retrieved from memory 143 by a user rather than having to reenter previously supplied information. Centralized server 140 correlates the target item and at least one source item identified by the user or consumer using a database and computer software stored in memory 143 to generate a resultant comparative sizing recommendation. In turn, the resultant comparative sizing recommendation is transmitted via network 135 back to the terminal (145a, 145b, 145c, 145d) either directly or via one of the intermediate servers (150a, 150b).

There are two classifications or types of users of the present inventive comparative sizing system. A registered user has an account and a non-registered user is a user during that current session (e.g., current browser or shopping session) for which no account is established. By way of example, the user who registers with the system will be prompted via the GUI to provide unique identification information such as a user name (e.g., e-mail address) and a password to establish and access his or her account. An account is created for each registered user. In turn, each account has associated therewith a primary, main or current virtual closet and any number of secondary, auxiliary or past virtual closets with database items as identified by the user stored in each virtual closet. The registered user after logging in has access to his or her virtual closets (e.g., current virtual closet and auxiliary virtual closets) rather than having to reenter the information stored therein.

A user is not required to register in order to use the system. If the user does not register then no account will be established. Instead, only source items previously entered during the current session may be retrieved from the user's current virtual closet. Since no account has been established, the non-registered user is not able to access information in the current virtual closet after he or she has completed the session, and each subsequent session will result in creation of a new current virtual closet. The non-registered user has a current virtual closet for storing items therein during that particular session, but does not have access to any auxiliary virtual closets.

Additional information about the user may improve the accuracy of the results of the comparative sizing recommendation. Regardless of the type of user, either registered or non-registered, one or more characteristics describing that user may be specified, wherein at least one of the characteristics is preferably gender. Other characteristics in addition to, or instead of, gender may include, but are not limited to, height, weight and/or age. An assumption as to the user's gender may be automatically ascertained based on the source and/or target items identified by the user. In such instances, the GUI prompts the user to confirm whether the assumed gender is correct. Otherwise, the user may specify his or her gender in response to a prompt from the GUI, without taking into consideration the source and/or target items. All database items in a virtual closet (e.g., a current virtual closet and possibly one or more auxiliary virtual closets) associated with a particular user will inherit the characteristics of that user. These characteristics may be provided initially upon creating an account, at the time of providing database items to be stored in the user's current virtual closet or requested anytime thereafter, as desired.

A comprehensive database of database items is developed based on real world user input as to well-fitting items. Each database item is associated with a single virtual closet and inherits the characteristics of the corresponding user. Furthermore, each database item is described by one or more database item properties such as, but not limited to, those properties discussed above with respect to source items and target items. The larger the volume of database items gathered and stored in the database, the more accurate the resultant comparative sizing recommendation. Users will only access the present inventive comparative sizing system and method and thus rely on the resultant comparative sizing recommendation generated therefrom if found to be accurate. Therefore, it is desirable to continuously update the database to include database items for new inventory and expand to include as many brands as possible. The database is stored in memory 143 associated with the centralized server 140.

The present invention distinguishes among two different uses of the comparative sizing system. A first use of the system is where a user (e.g., a registered user or a non-registered user) is interested in obtaining a comparative sizing recommendation to an identified target item. During use, the user identifies at least one source item and the target item for which a comparative sizing recommendation is requested. These source and target items are identified by respective properties. The at least one source item as identified by its respective properties is either identified for the first time by the user or selected from previously entered database items associated with the user's current virtual closet that are stored in the database. In the case of a non-registered user, the user is required to identify one or more source items with each new session.

Unlike the source item, the target item is not in the user's virtual closet and therefore must be identified by the user. As previously mentioned, the target item may be identified by the user by entering its target item properties via terminal (145). In the case of a user visiting an e-tailer's website, the target item properties associated with a particular item selected for purchase by the user are preferably automatically retrieved without the user having to enter this information. Yet another possibility is that the target item properties may be obtained by scanning the target item such as by scanning a label or tag associated with the target item.

To improve the accuracy of the present inventive comparative sizing system it is desirable to continuously gather information to be added as database items to the database. To achieve this end, the system may alternatively be used merely as a tool for gathering database items in which the user (e.g., registered user or non-registered user) provides information concerning one or more well-fitting items without specifying or requesting a comparative sizing recommendation for a target item. In such use since no target item is specified, the well-fitting item and associated properties provided by the user will be classified as a well-fitting representational item and associated well-fitting representational item properties, rather than a source item and associated source item properties. An incentive such as a discount, coupon or gift may be issued to encourage the user to provide such well-fitting representational items and associated properties. Other methods may be employed for encouraging users to register and provide information concerning well-fitting representational items and associated properties. In addition to individual users, the well-fitting representational items and their associated well-fitting representational item properties may be provided by users for hire. In a preferred embodiment, individual representatives are selected to try on a particular size in the manufacturer's or retailer's inventory. Preferably multiple representatives will be used for each size offered by the manufacturer or retailer to improve comparative sizing recommendation accuracy.

The database is populated with database items representing well-fitting representational items, source items and sometimes target items, irrespective of the type of user (e.g., registered users and non-registered users). In certain instances a target item may be stored as a database item in the database. Specifically, after receiving a comparative sizing recommendation for a target item, and typically after the user purchases and tries on the target item, feedback information may be received from the user. If the user confirms a proper fit of the target item based on the resultant comparative sizing recommendation provided, then the target item and its associated properties (including the resultant comparative sizing recommendation) is added as a database item and associated database item properties in the user's current virtual closet.

Comparative Processing

The centralized server 140 correlates the source items and the target item provided by the user with each database item in the database to generate source item matches and target item matches. In particular, a comparison is made between the source item properties of each source item with the database item properties of each database item in the database to identify those database items having at least one match among properties of each of the source and database items, respectively. Preferably, a database item is said to match if at least the source item and database item match in size. Most preferably, the source and database items match in brand as well as size, but this is not a requirement. The source and database items may, but need not necessarily, match with respect to any other property aside from size. Each database item having at least one property matching that of the source item properties of source items in the user's current virtual closet are hereinafter referred to as "a source-database item match."

A similar comparison is repeated for the target item. That is, the target item properties used to describe the target item are compared with the database item properties for each database item in the database to identify those database items having at least one match among properties. Each database item having at least one property matching that of the target item properties of target item are hereinafter referred to as "a target-database item match." Since the size of the target item is not provided, but instead to be determined, size will preferably not be a property forming the basis for a target-database item match.

A match weight is determined for each database item match (generically referring to either a source-database item match or a target-database item match). The match weight associated with the source-database item match is referred to as a "source-database item match weight", whereas the match weight associated with the target-database item match is hereinafter referred to as a "target-database item match weight."

Numerous weighting schemes may be employed for calculating the match weight of each source-database item match and target-database item match. Two exemplary weighting schemes will be described for illustrative purposes only.

In a first weighting scheme, a match weight (MW) is calculated based on the following equation:

$$\text{Match Weight}(MW) = \frac{\text{Number of matching data item properties}}{\text{Total number of data item properties}}$$

For instance, if a particular source-database item match is identified by four database item properties, three of which match with the source item properties for a particular source item, then the source-database item match weight is 0.75.

A second possible weighting scheme, involves predetermined weight factors assigned to each database item property used to identify the database item. For example, a database item may have two matching properties, e.g., "brand" assigned a weight factor of 0.50 and "material" assigned a weight factor of 0.10. The match weight for a database item match may then be the sum or multiplication of all weight factors of matching properties.

Any weighting scheme may be used so long as the match weight represents how well the items match.

A match weight may be assigned to any combination of source items, target items and/or database items.

All possible pairing combinations and permutations are made between the source-database item matches and the target-database item matches. Each pairing hereinafter referred to as a "source-target pair" includes a single source-database item match and a single target-database item match as well as their respective source-database item match weight and target-database item match weight. As previously noted, each database item in the database is associated with a single user's virtual closet that it represents. Since the characteristics of the user are also inherent to the associated virtual closet, then these characteristics of the user are inherently associated with each database item from that user's virtual closet. A comparable weight is assigned to each source-target pair based on the similarity of the database item properties of the database items of those respective virtual closets. If the two database items (including the inherited characteristics of the user) representing the particular source-target pair are associated with the same virtual closet the pairing is deemed fully compatible and assigned a comparable weight value of 1. Otherwise, if the two database items associated with a particular source-target pair are from different virtual closets a comparable weight<1 will be assigned to the pairing. The comparable weight varies depending on the similarity among other database items in the respective virtual closets, and the respective user's characteristics which the database items inherit.

Alternatively, the comparable weight may be assigned based on the degrees of separation. If two distinct users (different virtual closets) own one or more similar items in the same size, they are essentially treated as being in comparable closets having less than full weight. An illustrative example of a one degree separation is as follows: Consumer A has stored in his or her current virtual closet a first database item "size 4—Abercrombie™ style 'x'), and a second database item "size 6—GAP™ style 'y'"; Consumer B has stored in his or her current virtual closet a first database item "size 6—GAP™ style 'y'", and a second database item "size 8—Theory™ style 'z'"; Consumer C has stored in his or her current virtual closet a first database item "Theory™ style 'z'" and a second database item "size 4—Abercrombie™ style 'x'". The virtual closets of Consumers A and C have no database item properties in common, but each has some in common with those database item properties in the virtual closet associated with Consumer B. Therefore, the virtual closets associated with Consumers A and C are somewhat compatible and therefore assigned a comparable weight based on the number of common database items and their associated properties.

In either case a comparable weight may be assigned to any two database items such as a source-target pair.

Each source-target pair therefore has three corresponding weights: a source-database item match weight, a target-database item match weight and a comparable weight. These three weights are preferably multiplied together to generate a combination weight for each pairing. Accordingly, each source-target pair is associated with the size of the target-database item match (target match size) and a combination weight.

In a preferred embodiment the combination weight for each source-target pair will be compared to a predetermined combination weight threshold value. Those source-target pairs having a combination weight less than the predetermined combination weight threshold value will be disregarded and not processed further. It should be noted that in the preferred embodiment only the combination weight is compared to a predetermined threshold value; however, any of the weights such as the match weight and/or the comparable weight may alternatively, or in addition thereto, be compared to a respective predetermined threshold value.

The set of all possible combinations or permutations of source-target pairing is classified based on target match size into one or more groups. All source-target pairings having the same target match size are grouped together. For instance, all target match size "small" are grouped together; all target match size "medium" are grouped together; all target match size "large" are grouped together; and all target match size "X-large" are grouped together. In most cases there will be more than one group, with each group representing a different target match size. A recommendation weight (RW) is determined for each target match size group representing the relative likeliness that the target item match size will be deemed well-fitting. In a preferred embodiment the recommendation weight is determined using the following equation:

$$RW = \frac{\text{Sum of all combination weights for source-target pairs in a single group}}{\text{Sum of all combination weights in the set of all possible source-target pairs}}$$

The resultant comparative sizing recommendation is based on the recommendation weight assigned to each possible target match size. For example, the resultant comparative size recommendation may be selected as that target match size having the highest recommendation weight. Aside from a ranking of the recommendation weight values for each possible target match size, the deviation in recommendations weights among multiple possible target match sizes may also be considered in determining the resultant comparative size recommendation. In addition to the recommendation weight, other factors may be taken into consideration such as the number of source-target pairs in a particular group.

The resultant comparative target match size recommendation may be a single target match size (in the case of a high or strong probability of an accurate size recommendation) or multiple target match sizes (if the probability of the accuracy of the size recommendation is relatively low or weak).

All possible sizes of the target item may be displayed simultaneously with a single target match size being visually distinguished from the other sizes such as by a symbol (e.g., an arrow or a check mark), different shading, different colors, and/or any other visual differentiating indicator. Alternatively, only the single target match size may be displayed. If there is more than one target match size, visual indicia (e.g., shading of a single color, or different colors) may be employed with one target match size more prominent than the others. For example, the size number "28" may be shaded darkest to readily denote that it is most likely the best size, while size number "27" may be grayed in color to identify that there is a degree of uncertainty that it may be the correct recommendation.

An example of the comparative sizing processing in accordance with the present invention is described below for illustrative purposes only and is not intended to limit the scope of the present invention in any way.

Example

User A, a single-session non-registered user without an account provides a single well-fitting source item (Source Item 1) in their current wardrobe by identifying the following source item properties associated with Source Item-1: Brand:

Gap™, Item Type: Denim Pants, Style name: Curvy, Stretch: Yes, Waist: Low Rise, Cut: Skinny/Slim, Size: 4. These source item properties are then correlated to each Database Item in the database having a total of ten database items (Database Item-1, Database Item-2, . . . , Database Item-10) to generate a list of source-database item matches. In this example, source-database item matches require at least match in size and brand as well. Three source-database matches are identified.

A first source-database item match (SDIM-1) is identified among the source item properties associated with Source Item-1 and Database Item-2 having the following associated database item properties: Brand: Gap™, Item Type: Denim Pants, Style name: Curvy, Stretch: Yes, Waist: Low Rise, Cut: Skinny/Slim, Size: 4. Since there is a match among all source item properties associated with Source Item-1 and database item properties associated with Database Item-2, SDIM-1 is assigned a full or perfect match weight of 1.

A second source-database item match (SDIM-2) is identified among the source item properties associated with Source Item-1 and Database Item-3 having the following associated database item properties: Brand: Gap™, Item Type: Denim Pants, Style Name: Boot Cut, Stretch: Yes, Waist: Low Rise, Cut: Boot Cut, Size: 4. Since some of the database item properties associated with Database Item-3 do not match the source item properties associated with Source Item-1, SDIM-2 is assigned a match weight of less than 1, specifically a match weight of 0.8.

A third source-database item match (SDIM-3) is identified among the source item properties associated with Source Item-1 and Database Item-10 having the following associated database item properties: Brand: Gap™, Item Type: Skirt, Style Name: Pleated Wrap Skirt, Stretch: No, Waist: Low Rise, Size: 4. Since half of the database item properties associated with Database Item-10 do not match the source item properties associated with Source Item-1, and because the relatively important property of item type does not match, SDIM-3 is assigned a relatively low match weight of 0.4.

User A also selects a target item for purchase from an e-tailer's website. This target item has associated a complete set of target item properties already assigned to it by the retailer, so the user is not required to describe the item further. The target item properties assigned by the retailer to the target item include: Brand: Abercrombie & Fitch™, Item Type: Denim Pants, Style name: Erin Skinny, Stretch: Yes, Waist: Low Rise, Cut: Skinny/Slim. Size is not specified, of course, as this is the property for which User A is requesting a comparative sizing recommendation. All 10 database items are filtered, and weighted, according to these properties, generating target-database item matches. Three target-database item matches are identified.

A first target-database item match (TDIM-1) is identified among the target item properties associated with Target Item and Database Item-1 having the following associated database item properties: Brand: Abercrombie & Fitch™, Item Type: Denim Pants, Style Name: Emma, Stretch: Yes, Waist: Low Rise, Cut: Boot Cut, Size 2. Since some of the database item properties associated with Database Item-1 do not match the target item properties associated with the Target Item, TDIM-1 is assigned a match weight of less than 1, specifically a match weight of 0.8.

A second target-database item match (TDIM-2) is identified among the target item properties associated with the Target Item and Database Item-4 having the following associated database item properties: Brand: Abercrombie & Fitch™, Item Type: Zip/Button Shorts, Style Name: Donna, Stretch: No, Waist: Low Rise, Size: 4. Since most of the database item properties associated with Database Item-4 do not match the target item properties associated with the Target Item, and because the relatively important property of item type does not match, TDIM-2 is assigned a relatively low target match weight of 0.2.

A third target-database item match (TDIM-3) is identified among the target item properties associated with the Target Item and Database Item-9 having the following associated database item properties: Brand: Abercrombie & Fitch™, Item Type: Denim Pants, Style name: Erin Skinny, Stretch: Yes, Waist: Low Rise, Cut: Skinny/Slim, Size: 2. Since there is a match among all target item properties associated with the Target Item and database item properties associated with Database Item-9, TDIM-3 is assigned a full or perfect target match weight of 1.

At this point, each SDIMs is paired with all TDIMs, each maintaining their respective match weights and inherent user characteristics. Each source-target pair is assigned a "comparable weight" based on how comparable the two items are to one another. For the present example, there will be nine source-target pairs, three of which are described below.

SDIM-2 and TDIM-1 are in the same virtual closet (the respective database items in the pair are associated with the same user's virtual closet (including inherent characteristics)) thus this source-target pair is deemed fully comparable and assigned a weight of 1.

SDIM-1 and TDIM-3 are in different virtual closets, and so their comparable weight will be less than 1. Specifically, the comparable weight assigned to this pair will be based off of the similarity of database items in their respective virtual closets. In this case, SDIM-1 and TDIM-3 are from virtual closets that have in common many database items, respective database item properties, and corresponding user characteristics. Therefore, this source-target pair has a relatively high comparable weight of 0.8.

SDIM-1 and TDIM-2 are also in different virtual closets, and in this case, their virtual closets share very little in common. Therefore, the source-target pair will have a relatively low comparable weight, for example, 0.2.

Each source-target pair has three associated weights (e.g., source match weight, target match weight, and comparable weight) that are multiplied to generate a combination weight for each pair. The combination weight for SDIM-2 and TDIM-1 is equal to (0.8×0.8×1)=0.64. For SDIM-1 and TDIM-3, the combination weight is equal to (1×1×0.8)=0.8. The combination weight for SDIM-1 and TDIM-2 is equal to (1×0.2×0.2)=0.04.

The comparable weights and combination weight calculations for the remaining 6 source-target pairs are calculated in a similar manner, not specifically shown.

At this point, the only relevant information is the target match size and combination weight. Target match sizes with combination weights below a predetermined combination weight threshold of 0.1 are withdrawn from consideration. Therefore the source-target pair of SDIM-1 and TDIM-2 will be withdrawn from consideration since its combination weight does not exceed the predetermined combination weight threshold.

Once all combination weights are calculated for each of the source-target pairs and those source-target pairs whose combination weight is below the threshold are withdrawn from consideration, six source-target pairs remain with the following target match sizes and combination weights: Size 2—combination weight 0.8; Size 2—combination weight 0.8; Size 2—combination weight 0.64; Size 4—combination weight 0.14; Size 2—combination weight 0.48; Size 2—combination weight 0.22. Next, these source-target pairs are grouped by common target match size. The respective combination weights for all source-target pairs in a particular target match size group are added together and divided by the total combination weight of all source-target pairs to determine the recommendation weight. For example, the group target match size "2" is assigned a recommendation weight $0.95=((0.8+0.8+0.64+0.48+0.22)/(0.8+0.8+0.64+0.48+0.22+0.14))$. The group target match size "4" is assigned a recommendation weight of $0.05=(0.14/(8+0.8+0.64+0.48+0.22+0.14))$. Since the recommendation weight 0.95 for the target match size "2" is significantly higher than the recommendation weight 0.05 for the target match size "4", "2" will be the resultant comparative sizing recommendation.

If size "2" had not had such a significantly higher weight, another source item, Source Item 2, could be entered by User A. The item properties of Source Item-2 are then used to filter all database items to generate a second list of SDIMs. Assume 5 SDIMs are identified based on Source Item-2. The 5 SDIMs for Source Item-2 are appended to the 3 SDIMs identified for Source Item-1, resulting in a total of 8 SDIMs. At this point, all further steps will continue as described above.

Verification Checking, and Improved Accuracy

In such case in which the resultant comparative sizing recommendation includes multiple target match sizes or even if a single target match size is generated for the resultant comparative sizing recommendation, a verification or checking operation may be performed by the user. Specifically, the user identifies an additional source item that differs from the previously considered source items and repeats the comparative sizing process taking into consideration both the previously considered source items and the additional source item.

For example, after generating a resultant comparative sizing recommendation based on a first source item, in response to activating this verification or checking operation the user is prompted to enter a second source item and associated second source item properties. Specifically, the source-database item matches determined for the second source item will be appended to the previously identified source-database item matches for the first source item, and the remaining comparative processing operation performed for this new combined set of source-database item matches. Comparative sizing processing, as described above, is repeated taking into consideration both the first source item and the second source item. If the same resultant comparative sizing recommendation is generated for the combined first and second source items as that using only the first source item then a visual and/or audio indicator is activated to alert the user. For example, an arrow, a check mark or text may be visually displayed (such as "Size Recommendation Confirmed") to alert the consumer as to the confirmation of the same resultant comparative size recommendation using both the first and second source items as was previously generated for the first source item alone. Any other type of indicator may be employed, as desired. Otherwise, if the resultant comparative size recommendation for both the first and second source items differs from that of the first source item alone then only the resultant comparative sizing recommendation when taking into consideration both the first and second source items will be displayed since its accuracy is greater. If two different target size matches are generated as the resultant comparative sizing recommendation when taking into account both the first and second source items, preferably the user is automatically prompted to enter yet another source item (e.g., a third source item) in the hope of narrowing down the resultant comparative size recommendation to a single target match size, rather than multiple target match sizes. The user may waive this third or subsequent iteration by simply canceling such operation. Any number of multiple iterations are contemplated and within the intended scope of the present invention. When multiple possible target match sizes are reduced down in number to a single target match size it is the only size displayed.

From analyzing the database items in the database it may be determined that certain items in the database have a greater occurrence and therefore would produce more matches during the comparative sizing process if available and identified as a source item by the user. In view of this, at any time when the user identifies or selects a source item the GUI automatically generates a drop down menu of the top predetermined number list of one or more preferred properties, preferably at least brand name and may also specify style name. For example, a top 10 list of brand names may be generated and displayed representing the preferred top 10 brand names as determined by an analysis of the database items and their associated database item properties in the database that would produce the greatest number of matches if selected as source items and associated properties. If possible, the user can identify a new source item or select an existing database item from their source closet that matches at least that brand name, and possibly style name.

To verify the accuracy of a single target match size or to possibly reduce the number of target match sizes when there is more than one, the user may be prompted via the GUI to provide one or more additional properties associated with the previously considered source item. In such case, the comparative sizing processing is repeated using the same source items including the additional one or more source item properties provided by the user. Once again, the user is presented with the option of performing multiple iterations to insure a single target match size as the resultant comparative sizing recommendation.

Virtual Closets of Registered Users

Registered users of the system will be assigned a unique account having associated therewith one or more virtual closets including at least one current virtual closet. Information including database items and their associated database item properties in the registered user's virtual closet may be accessed by him or her in response to providing personal information such as a unique password and/or user name. The registered user is able to access from the memory 143 all database items and associated database item properties from his or her virtual closet (e.g., current virtual closet or auxiliary virtual closet). Any one or more of the database items selected from the user's current virtual closet to be source items and/or any newly identified source items may form the basis for performing comparative sizing recommendations for a target item. Database items in any of the user's auxiliary virtual closets may not be selected as source items due to the fact that they are not necessarily deemed to be well-fitting. The database items stored in a registered user's current virtual closet may also be accessed by other individuals such as friends and relatives. This is particularly advantageous in that other individuals may obtain a comparative sizing recommendation for a target item to purchase on behalf of the registered user based on the database items retrieved from the user's current virtual closet.

The user is encouraged to update the characteristics (e.g., weight, age, height) associated with their account and thus inherent to the items in their current virtual closet. In addition, the registered user may add database items, remove database items, or revise database item properties at any time within his or her virtual closet. By way of illustrative example, a user may go on a diet and lose weight wherein certain previously identified well-fitting database items associated with the user's current virtual closet may no longer fit. The previously identified database items may be removed from the user's current virtual closet. In a preferred embodiment, during a single session when database items are removed from the user's current virtual closet a new auxiliary virtual closet is created to reflect the database items and database item properties in the account prior to the removal of those items. An auxiliary virtual closet is established so that the database items may be retained in the database and utilized when performing comparative sizing operations. As an example, a registered user has stored in her account three identified database items 1, 2 and 3 and their associated database item properties. After gaining weight, items 1 and 3 no longer fit, while she purchases a new item 4 which fits. Her current virtual closet is revised to reflect only database items 2 and 4. An auxiliary virtual closet is created that includes the database items in the user's current virtual closet before being updated or revised (e.g., items 1, 2 and 3). Any number of auxiliary virtual closets may be created for a particular registered user over time with a new auxiliary virtual closet being created each time the registered user removes a database item from his or her current virtual closet.

Suggested Items

There is a case where the user may identify one or more preferred properties with the intent of receiving a list of suggested items from those items for purchase offered by a retailer or perhaps items in the retailer's current inventory. This list of one or more suggested items and associated suggested item properties is generated by using the one or more preferred properties as a filter for all items for purchase offered by the retailer. Each suggested item and associated suggested item properties represents a single target item and associated target item properties. From that point, all individual target items and the given source item(s) each go through the comparative sizing method described above. The result is a list of target items with their corresponding size recommendations identified by the filter based on the user-specified preferred item property. For example, a user may request to generate a suggested list of all items and their respective resultant comparative sizing recommendations offered for purchase from a retailer that meet the specifications of being Brand Name: Gap™ and Generic Description of Item Type: denim. The user-specified preferred properties are then used to filter all of the retailer's inventory. The result is a list of suggested items and associated suggested item properties, i.e. all of which satisfy the properties of being both Brand Name Gap™ and Generic Description of Item Type: denim. Each suggested item and associated suggested item properties represents a single target item and associated target item properties. Each target item is then individually compared with the given source item(s) to generate a comparative sizing recommendation for each based on the same method outlined previously.

Additionally, recommendations for one or more suggested target items based on the single target item and all its target item properties specifically identified by the user (i.e., on a retailer's site) may be automatically generated. In response to the user activating this functionality, one or more suggested target items will be identified. Alternatively, such recommendations of suggested target items may be automatically generated and displayed without requiring activation by the user. This feature is an electronic form of suggestive marketing whereby the user is presented with other possible suggested target items to purchase thereby increasing the probability that the consumer may purchase more than one item. Another application for such feature is when the target match size for the target item specified by the user is not in stock or possibly not available (i.e., the item may not be manufactured to accommodate the user's size). For example, the manufacturer may only design an item for sizes 6 through 14, wherein the target match size may be less than a size 6 or greater than a size 14. This feature may be used to direct the user to other similar items that are currently in stock, available in the user's size and offered by the same retailer as the target item identified by the user. The comparative sizing scheme based on the user's current virtual closet is applied to any suggested target item so that the user's target match size is automatically displayed along with the suggested target item itself.

Automatic Size Display

Each item offered for sale on a particular e-tailer's website that is similar to those source items previously provided may automatically display the user's resultant comparative sizing recommendation without any additional user involvement. Access to all previously stored database items and associated database item properties from that user's current virtual closet is gained once he or she has registered and logged in thereby eliminating the need to have to reenter those database items and their associated database item properties to be selected by the user as source items. Despite having access to all previously stored database items and associated database item properties in the user's or consumer's current virtual closet, he or she is nevertheless permitted to verify the accuracy of the sizing recommendation, as described above, by determining the comparative sizing recommendation based on a new source item and/or entering additional properties associated with the source item for which comparative sizing has already been determined. This automatic size display feature is also available to non-registered users after processing of one resultant comparative sizing recommendation is completed, but will cease upon termination of the session.

If a second identified or selected target item has the same generic description item type then preferably, by default, the same source items specified for the first target item will be automatically provided for the second target item without having to be identified again by the user. This feature would be available regardless of whether the user was registered or not. However, in the case of a non-registered user this convenience would be limited only to the current session of use.

Secondary Sizes

A garment will generally have its primary size (e.g., small, medium, large, 0, 1, 2, 4, 6) on the garment itself or label attached thereto. However, there are one or more secondary sizes that may also be identified on the garment itself or a label attached thereto. Some secondary sizes may include, but are not limited to, any one of the following: inseam for pants; length for shirts (e.g., petite, regular or tall); or neck size, chest size or arm length for men's dress shirts and suit jackets. Multiple secondary sizes may be used to describe a single garment or item. Some target items identified by the user will have at least one secondary size associated therewith. This secondary size may be gathered in one of two ways. In the first option, the secondary size may be ascertained from one of the selected or identified source items if provided as part of the size source item property associated therewith. The correlation is first performed on the primary size as one of the specified source item properties without taking into consideration secondary size. A resultant comparative sizing recommendation is generated based on the primary size (e.g., target match size is primary size). The correlation is performed again with the secondary size as one of the specified source item properties as well as primary size. A resultant comparative sizing recommendation is generated based on the secondary size (e.g., target match size is secondary size). Thus, a target match secondary size will be realized not by requiring the user to obtain body measurement but instead by relying on the representative secondary size of a source item as identified on the item itself and performing correlative processing on the database items. For example, if inseam is the secondary size required for the target item, the user reads the tag of a GAP™ boot cut jean having a "long" inseam in his or her wardrobe and provides this information as the source item properties associated with a source item. The resultant comparative sizing recommendation may identify as the comparable inseam classification in the target item the user is browsing as an "extra long."

In the case in which the user does not have a representative source item with the particular secondary size (i.e., there is no garment in his or her wardrobe with the desired secondary size and no source items specify the desired secondary size as one of their source item properties), then the user may provide his or her true measured value for that secondary size. Since under these circumstances the secondary size is not associated with any particular source item (as was the case in the first option) then the secondary size represents a characteristic (similar to that of age, height, weight or gender) that once provided is inherent to all database items associated with that user's virtual closet (either current virtual closet or auxiliary virtual closets).

Both options may be employed, the first option being presented first and relying on the second option only in the case in which the first option is moot because no source items having the secondary property are provided or the one selected yields no conclusive recommendation. Alternatively, each option may be employed independently.

Figure 2:
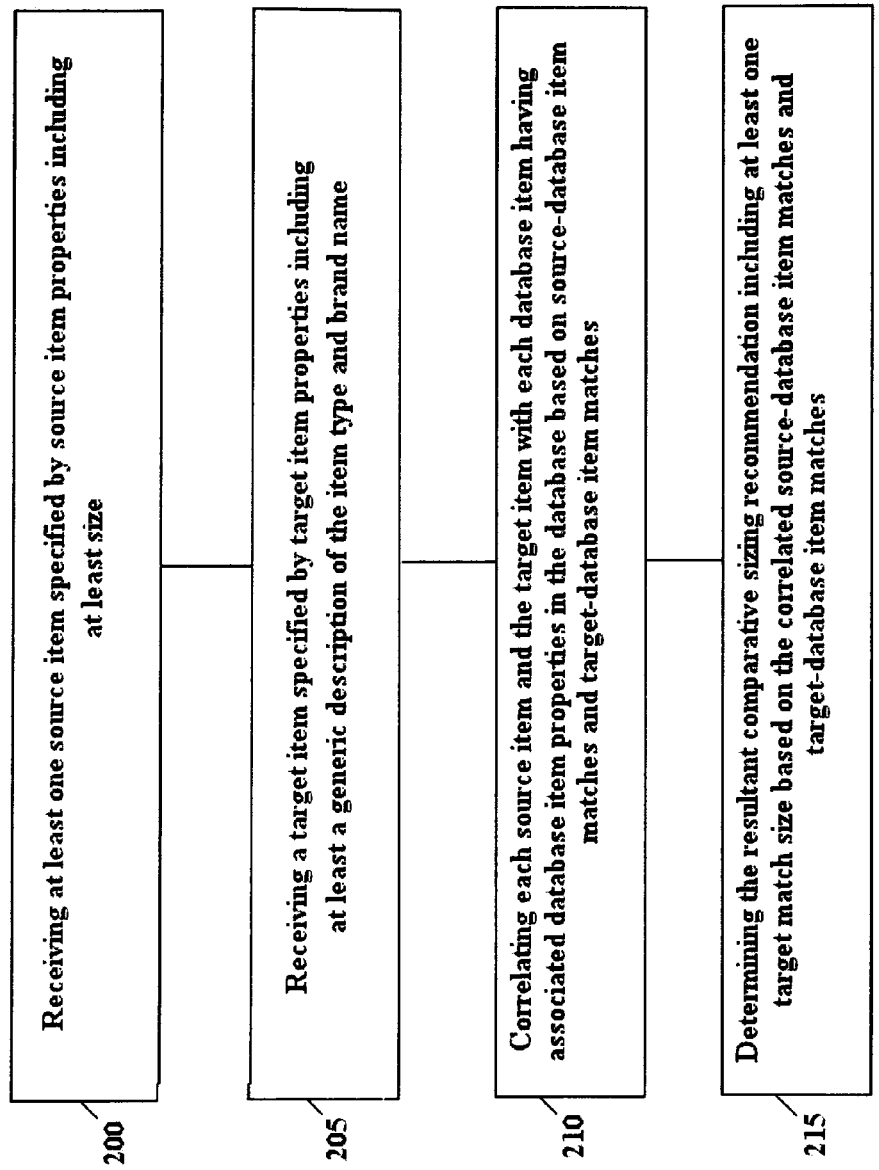
FIG. 2 is an exemplary flow chart of operation of the comparative sizing system of FIG. 1.

FIG. 2 is an exemplary flow chart of the steps taken during operation of the comparative sizing recommendation system in accordance with the present invention. Initially, in step 200 the centralized server 140 receives from the user via one of the terminals (145a, 145b, 145c, 145d) at least one source item as specified by its associated source item properties preferably including at least size. Each source item may be either a new source item identified for the first time by the user or an item selected from those previously entered database items in the user's current virtual closet stored in the database. The accuracy of the resultant comparative sizing recommendation may improve when more source item properties are provided to identify the source item, preferably at least size, most preferably size and brand name are specified. In addition to the source item, the centralized server 140 also receives (in step 205) from the user via the terminal a target item for which they are interested in obtaining a resultant comparative sizing recommendation, wherein the target item is specified by at least one target item property. Preferably the at least one target item property includes at least generic description of item type, most preferably at least generic description of item type and brand name. Thereafter, in step 210, a correlation or conversion is made for each source item and the target item with each database item having associated database item properties in the database based on source-database item matches and target-database items matches. No knowledge concerning body measurements is required to perform the comparative sizing between source item and target item. The resultant comparative sizing recommendation including at least one target match size is determined based on the correlated source-database item matches and target-database item matches in step 215. To increase the accuracy of the resultant comparative sizing recommendation, steps 200 through 215 may be iteratively repeated by adding additional source items. This process may be repeated for any number of source items, as desired.

The present inventive system and method has a wide variety of uses or applications of which a few non-exhaustive examples will be described in further detail.

In Brick-and-Mortar Retail Store Location

When shopping in a brick-and-mortar retail store or on site retail location a consumer typically takes into a dressing room more than one size of any particular item to determine which fits best. Kiosks, desktops, notebooks, laptops, handheld devices or other portable or non-portable electronic computing devices may be located within a physical ("brick-and-mortar") retail store whereby the consumer prior to taking a target item into the dressing room to try on or making a purchase may access the system and method in accordance with the present invention to obtain his or her resultant comparative size recommendation in the target item.

Website Via the Internet

As previously noted, today's technology-driven environment shows a continued trend towards online retail shopping via the Internet. The present claimed invention is particularly well suited to be seamlessly integrated into any e-tailer's website using an Application Programming Interface (API). Access by the consumer to the present inventive comparative sizing recommendation system will preferably be via a "COMPARATIVE SIZING" button automatically generated by the e-tailer's graphical user interface (GUI) so as to be displayed proximate the size selection and/or check out. Preferably the consumer is provided access to the "COMPARATIVE SIZING" button without having to leave the e-tailer's website thereby improving the conversion rates for that particular store. Access to the present inventive comparative sizing recommendation system and method may be customized for each e-tailer's website.

When accessing the comparative sizing recommendation system and method from an e-tailer's website, if the consumer has already selected a particular item offered for sale on the e-tailer's website, then in response to activating the "COMPARATIVE SIZING" button, the target item and associated target item properties will preferably be automatically retrieved by the API and transmitted to the centralized server 140, without the user having to reenter such information. To make the service more user friendly, preferably, the only information the user or consumer will be prompted to provide to process the comparative sizing recommendation scheme is at least one source item as specified by its source item properties.

When accessing the present inventive comparative sizing recommendation system from an e-tailer's website, the target item specified by the user and any possible suggested target items may be restricted to only those items offered for sale by the e-tailer.

The user may also access the present inventive comparative sizing recommendation system and method by directly visiting its website, rather than accessing the scheme through a particular e-tailer's website. This direct access on behalf of the user is valuable in that it does not limit or restrict the brands or styles of a target item requested by the user based on the retailer or suggested target items for which a comparative sizing recommendation may be obtained to any particular retailer, wholesaler or manufacturer.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A computer implemented method for operating a comparative sizing system, using a computer system including a plurality of database items in a database, each of the at least one database items having at least one database item property associated therewith, comprising the steps of:
    (a) receiving and storing in a memory device:
        (i) at least one well-fitting source item, each of the at least one source items having at least one source item property associated therewith, wherein the at least one well-fitting source item is determined to be well-fitting by a wearer of the at least one source item;
        (ii) a target item and at least one associated target item property for which a resultant comparative sizing recommendation is being requested based on the at least one source item as specified by its at least one source item property associated therewith;
    (b) retrieving from the memory device and correlating each of the at least one source items with each of the plurality of database items in the database stored in the memory device based on source-database item matches between the associated at least one source item property of each of the at least one source items and the associated at least one database item property of each of the plural database items in the database; and
    (c) retrieving from the memory device and correlating each of the at least one target items with each of the plurality of database items in the database based on target-database item matches between the associated at least one target item property of the target item and the associated at least one database item property of each of the plural database items in the database; and
    (d) determining the resultant comparative sizing recommendation using the computer system, wherein the resultant comparative sizing recommendation includes at least one target match size based on the correlated source-database item matches and target-database item matches.

2. The method in accordance with claim 1, wherein: (i) the at least one source item property associated with each of the at least one source items represents information which may be obtained from a visual observation without requiring any body measurements; (ii) the at least one target item property associated with the target item represents information which may be obtained from a visual observation without requiring any body measurements, and (iii) the at least one database item property associated with each of the database items represents information which may be obtained from a visual observation without requiring any body measurements.

3. The method in accordance with claim 2, wherein at least one of the at least one source item property, the at least one target item property or the at least one database item property are visually observed from a label associated therewith.

4. The method in accordance with claim 1, wherein each of the at least one source item property, the at least one target item property and the at least one database item property represent at least one of the following: primary size; secondary size; brand name; generic description of item type; item sub-type; style name; style number; Registered Identification Number; stretch; waist; cut; color; and material.

5. The method in accordance with claim 1, wherein the at least one source item property for each of the at least one source items includes at least primary size.

6. The method in accordance with claim 5, wherein the at least one source item property for each of the at least one source items includes at least brand name.

7. The method in accordance with claim 1, further comprising the step of verifying the accuracy of the resultant comparative sizing recommendation by receiving at least one additional well-fitting source item having at least one source item property associated therewith; and repeating steps (b) and (c) for all source items and the associated at least one source item property of each including the at least one additional well-fitting source item and the at least one source item property associated therewith.

8. The method in accordance with claim 1, wherein the at least one target item property for the target item includes at least generic description of item type.

9. The method in accordance with claim 8, wherein the at least one target item property for the target item includes at least brand name.

10. The method in accordance with claim 1, wherein the database items and their associated database item properties in the database are associated with a virtual closet for each user.

11. The method in accordance with claim 10, further comprising the step of receiving at least one characteristic of the user, wherein the at least one characteristic is inherent to all database items and associated database item properties of that user's virtual closet.

12. The method in accordance with claim 11, wherein the at least one characteristic includes at least one of: gender, height, weight and age.

13. The method in accordance with claim 11, wherein step (c) comprises the step of assigning a comparable weight to a database-database item match representing how well the respective properties of the database items in the respective virtual closets match, wherein the comparable weight is determined based on at least one of: (i) number of database-database item matches; (ii) common characteristics associated with the respective virtual closets; and (iii) degree of separation between the respective virtual closets.

14. The method in accordance with claim 10, wherein the plural database items and their associated at least one database item property in the database associated with a particular user's current virtual closet represent: (i) the at least one source item and associated at least one source item property for each provided by that particular user for which the resultant comparative sizing recommendation is being requested for the target item and associated at least one target item property; (ii) the target item and associated at least one target item property so long as feedback information received confirms a well-fit of the target item selected based on the resultant comparative sizing recommendation; and (iii) at least one well-fitting representational item and associated at least one well-fitting representational item property for which no comparative sizing recommendation is being requested and no target item and associated target item properties is being specified.

15. The method in accordance with claim 10, wherein in step (a) the received at least one source items and the associated at least one source item property are: (i) identified for a first time; or (ii) retrieved from the plural database items and the associated at least one database item property associated therewith stored in the database in the particular user's current virtual closet.

16. The method in accordance with claim 10, further comprising the steps of:
   removing at least one of the at least one database item and the associated at least one database item property in a particular user's current virtual closet; and
   creating in the database an auxiliary virtual closet including the at least one database item and the associated at least one database item property in the particular users' current virtual closet prior to the removal.

17. The method in accordance with claim 1, wherein in step (b) each source-database item match represents a match in at least one property among the at least one database item property and the at least one source item property for the respective plural database items and the source item; and each target-database item match represents a match in at least one property among the at least one database item property and the at least one target item property for the respective plural database items and the target item.

18. The method in accordance with claim 17, wherein each source-database item match represents a match in at least size among the at least one database item property and the at least one source item property for the respective plural database items and the source items.

19. The method in accordance with claim 17, wherein each source-database item match represents a match in at least brand name among the at least one database item property and the at least one source item property for the respective plural database items and the source items.

20. The method in accordance with claim 1, wherein step (c) comprises the steps of assigning at least one of the following: (i) a source-database item match weight to the source-database item match representing how well the respective properties of the respective source items and the database items match; (ii) a target-database item match weight to the target-database item match representing how well the respective properties of the respective target item and the database items match; (iii) a source-target item match weight to a source-target item match representing how well the respective properties of the respective source items and the target item match; (iv) a database-database item match weight to a database-database item match representing how well the respective properties of the database items match; and (v) assigning a source-source item match weight to the source-source item match representing how well the respective properties of the respective source items match.

21. The method in accordance with claim 1, wherein step (c) comprises the step of grouping source-target pairs based on target match size, wherein all source-target pairings having the same target match size are grouped together in the same target match size group.

22. The method in accordance with claim 21, wherein step (c) comprises determining a recommendation weight for each target match size group which represents the relative likeliness that the target item will be deemed well-fitting in the respective target match size.

23. The method in accordance with claim 22, wherein step (c) comprises determining the resultant comparative sizing recommendation based on the recommendation weight assigned to each possible target match size group.

24. The method in accordance with claim 21, wherein step (c) comprises determining the resultant comparative sizing recommendation based on a number of source-target pairs in each possible target match size group.

25. The method in accordance with claim 1, further comprising the step of receiving at least one additional source item property associated with the at least one source item; and repeating steps (b) and (c) for the at least one source item and the associated at least one source item property of each including the at least one additional source item property to potentially improve accuracy of the resultant comparative sizing recommendation.

26. The method in accordance with claim 1, wherein the step (a) of receiving the target item of at least one associated target item property comprises the steps of:
   receiving at least one preferred property for obtaining at least one suggested item and associated suggested item properties from items for purchase offered by a retailer;
   filtering the items for purchase based on the received at least one preferred property to identify the at least one suggested item and its associated at least one suggested item property; and
   wherein each of the at least one suggested item and associated suggested item properties represents a single target item and associated target item properties, respectively.

27. The method in accordance with claim 26, wherein steps (b) and (c) are repeated for each target item and associated at least one target item property.

28. A computer program embodied on a computer-readable medium for operating a comparative sizing system comprising:
   (a) a code segment that receives a plurality of database items in a database, each of the at least one database items having at least at least one database item property associated therewith;
   (b) a code segment that receives at least one well-fitting source item, each of the at least one source items having at least one source item property associated therewith, wherein the at least one well-fitting source item is determined to be well-fitting by a wearer of the at least one source item;
   (c) a code segment that receives a target item and at least one associated target item property for which a resultant comparative sizing recommendation is being requested based on the at least one source item as specified by its at least one source item property associated therewith;
   (d) a code segment that correlates each of the at least one source items with each of the plurality of database items In the database based on source-database item matches between the associated at least one source item property of each of the at least one source items and the associated at least one database item property of each of the plural database items in the database; and that correlates each of the at least one target items with each of the plurality of database items in the database based on target-database item matches between the associated at least one target item property of the target item and the associated at least one database item property of each of the plural database items in the database; and
   (e) a code segment that determines the resultant comparative sizing recommendation including at least one target match size based on the correlated source-database item matches and target-database item matches.

* * * * *

UNITED STATES PATENT AND TRADEMARK OFFICE
CERTIFICATE OF CORRECTION

PATENT NO.         : 8,095,426 B2                             Page 1 of 1
APPLICATION NO.    : 12/070619
DATED              : January 10, 2012
INVENTOR(S)        : Adelman et al.

It is certified that error appears in the above-identified patent and that said Letters Patent is hereby corrected as shown below:

Claims section:

Col. 21, claim 1, line 37, delete "(c)";
Col. 21, claim 1, line 44, change "(d)" to --(c)--.

Col. 24, claim 28, line 33, delete "at least" (first occurrence);
Col. 24, claim 28, line 48, change "In" to --in--.

Signed and Sealed this
Thirteenth Day of March, 2012

David J. Kappos
*Director of the United States Patent and Trademark Office*